United States Patent
Inoue et al.

(10) Patent No.: US 9,593,254 B2
(45) Date of Patent: Mar. 14, 2017

(54) AQUEOUS COATING LIQUID AND COATED FILM

(71) Applicant: THE NIPPON SYNTHETIC CHEMICAL INDUSTRY CO., LTD., Osaka (JP)

(72) Inventors: Kaoru Inoue, Osaka (JP); Tamae Naito, Osaka (JP)

(73) Assignee: THE NIPPON SYNTHETIC CHEMICAL INDUSTRY CO., LTD., Osaka (JP)

( * ) Notice: Subject to any disclaimer, the term of this patent is extended or adjusted under 35 U.S.C. 154(b) by 310 days.

(21) Appl. No.: 14/346,179

(22) PCT Filed: Sep. 28, 2012

(86) PCT No.: PCT/JP2012/075206
§ 371 (c)(1),
(2) Date: Mar. 20, 2014

(87) PCT Pub. No.: WO2013/047814
PCT Pub. Date: Apr. 4, 2013

(65) Prior Publication Data
US 2014/0227544 A1  Aug. 14, 2014

(30) Foreign Application Priority Data

Sep. 30, 2011 (JP) ................................ 2011-217621
Sep. 27, 2012 (JP) ................................ 2012-213369

(51) Int. Cl.
| | |
|---|---|
| *C09D 129/04* | (2006.01) |
| *C09D 171/02* | (2006.01) |
| *C09D 179/02* | (2006.01) |
| *C08G 73/02* | (2006.01) |
| *C09D 5/02* | (2006.01) |
| *C09D 7/12* | (2006.01) |

(52) U.S. Cl.
CPC ....... *C09D 129/04* (2013.01); *C08G 73/0206* (2013.01); *C09D 5/027* (2013.01); *C09D 7/125* (2013.01); *C09D 171/02* (2013.01); *C09D 179/02* (2013.01); *C08G 2650/58* (2013.01); *Y10T 428/31797* (2015.04)

(58) Field of Classification Search
None
See application file for complete search history.

(56) References Cited

U.S. PATENT DOCUMENTS 6,465,078 B1 * 10/2002 Kawai .................. B41M 5/5245
428/32.26
2003/0112311 A1  6/2003  Naik et al.
2010/0323189 A1  12/2010  Illsley et al.

FOREIGN PATENT DOCUMENTS

| JP | 08-24816 A | 9/1996 |
|---|---|---|
| JP | 2004-538187 A | 12/2004 |
| JP | 2005-208203 A | 8/2005 |
| JP | 2005-208203 A | 8/2005 |
| JP | 2005-221542 A | 8/2005 |
| JP | 2005-221717 A | 8/2005 |
| JP | 2005-345978 A | 12/2005 |
| JP | 2006-096822 A | 4/2006 |
| JP | 2006-308879 A | 11/2006 |
| JP | 2006-349724 A | 12/2006 |
| JP | 2007-161795 A | 6/2007 |
| JP | 2007-171755 A | 7/2007 |
| JP | 2007-292835 A | 11/2007 |
| JP | 2007-298645 A | 11/2007 |
| JP | 2009-221372 A | 10/2009 |
| JP | 2001-121658 A | 5/2011 |
| WO | 2009/098463 A1 | 8/2009 |

OTHER PUBLICATIONS

European search report issued for application No. 12836282.9, mail date is May 22, 2015.

* cited by examiner

*Primary Examiner* — Sheeba Ahmed
(74) *Attorney, Agent, or Firm* — Greenblum & Bernstein, P.L.C.

(57) ABSTRACT

To obtain an aqueous coating liquid which affords, by applying it on a plastic substrate and drying it, a coated film excellent in transparency, gas barrier properties, and adhesiveness to the substrate and excellent in homogeneity.
An aqueous coating liquid containing a polyvinyl alcohol resin (A), a polyethyleneimine (B), a nonionic surfactant (C), and an aqueous solvent (D).

5 Claims, No Drawings

AQUEOUS COATING LIQUID AND COATED FILM

TECHNICAL FIELD

The present invention relates to an aqueous coating liquid comprising a polyvinyl alcohol resin as a main component. More particularly, the present invention relates to an aqueous coating liquid capable of forming a gas barrier coated film or a gas barrier layer by applying the aqueous coating liquid on a substrate surface such as a plastic and drying it.

BACKGROUND ART

As a method for imparting oxygen gas barrier properties to a film, a sheet, or a molded body such as a bottle or a cup, which is made of a plastic, a technology of applying and drying an aqueous solution of a polyvinyl alcohol resin (hereinafter abbreviated as PVA resin) to form a PVA resin coated film or PVA resin layer, which is excellent in gas barrier properties, is useful.

However, since a PVA resin is a hydrophilic resin, it is poor in affinity to hydrophobic materials and, in the case where a substrate is a hydrophobic resin such as a polyolefin resin or a polyester resin, it is necessary to subject a surface of the substrate to a treatment with an anchoring agent or a hydrophilization treatment or to make an adhesive layer intervene. Of these, the surface treatment with an anchoring agent has widely been used but has problems that production steps increase and there is a possibility of exerting influence on properties.

Correspondingly, there has been proposed a multilayered film in which adhesiveness between the PVA resin layer and the substrate layer is improved by blending into a coating liquid containing an aqueous anchoring agent and a PVA resin to a polyolefin film substrate (see, for example, Patent Document 1).

On the other hand, for the purpose of improving printability, gas barrier properties, and transparency of a PVA laminated film, there has been proposed a laminated film in which a polyethyleneimine (hereinafter abbreviated as PEI) is blended in a small amount into a PVA layer (see, for example, Patent Document 2).

RELATED ART

Patent Documents

Patent Document 1: JP-A-8-245816
Patent Document 2: JP-A-2001-121658

SUMMARY OF INVENTION

Problems to be Solved by the Invention

However, a PVA resin and PEI are well compatible with each other in an aqueous solution but there is a tendency of generation of phase separation as water is vaporized during a drying step after coating. As a result, there are cases where sufficient gas barrier properties are not obtained, unevenness in thickness occurs, and appearance and transparency of the coated film are impaired.

Namely, an object of the present invention is to provide an aqueous coating liquid which contains a PVA resin as a main component, is excellent in gas barrier properties and adhesiveness to a substrate, and affords a coated film excellent in homogeneity.

Means for Solving the Problems

As a result of extensive studies in consideration of the above circumstances, the present inventors have found that the object of the invention is achieved by an aqueous coating liquid comprising a PVA resin (A), PEI (B), a nonionic surfactant (C), and an aqueous solvent (D), and thus they have accomplished the invention.

It is presumed that adhesiveness to a substrate is improved by blending PEI (B) into the PVA resin (A), furthermore, compatibility of the PVA resin with PEI (B) is improved by the nonionic surfactant (C), and therefore phase separation of both resins is suppressed during coating/drying.

Effects of the Invention

Since a coated film obtained by applying the aqueous coating liquid of the present invention to a plastic substrate and drying it is excellent in transparency, gas barrier properties, and adhesiveness to the substrate and is further excellent in homogeneity, the coating liquid can be suitably used as a coating liquid for gas barrier layer formation for plastic films, sheets, or various molded articles.

EMBODIMENTS FOR CARRYING OUT THE INVENTION

The following explanation of the constituent elements is one example (typical example) of the present invention, and the invention should not be construed as being limited to the contents.

The following will explain the present invention in detail.

The aqueous coating liquid of the present invention (also referred to as "aqueous coating composition") is an aqueous coating liquid comprising PVA resin (A), PEI (B), a nonionic surfactant (C), and an aqueous solvent (D).

The following will explain the elements in order.

[PVA Resin (A)]

First, the PVA resin (A) for use in the present invention is described.

The PVA resin (A) is a resin containing a vinyl alcohol structural unit as a main component, which is obtained by saponifying a polyvinyl ester resin obtained by copolymerization of vinyl ester monomers, and is composed of the vinyl alcohol structural unit, whose content corresponds to a saponification degree, and a vinyl ester structural unit.

The above vinyl ester monomer includes vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, vinyl versatate, and the like, and vinyl acetate is preferably used from the economical point.

An average polymerization degree (measured in accordance with JIS K6726) of the PVA resin (A) for use in the present invention is usually 100 to 3,000, and one having a polymerization degree of particularly 200 to 1,000, further 300 to 600 is preferably used.

When the average degree of polymerization is unduly small, strength of the coated film tends to be insufficient and, when the degree is unduly large, viscosity of the aqueous coating liquid becomes high and thus there is a tendency that coatability decreases and/or drying requires high temperature and/or a long period of time.

Moreover, a saponification degree (measured in accordance with JIS K6726) of the PVA resin (A) for use in the present invention is usually 80 to 100 mol %, and one having a saponification degree of particularly 90 to 99.9 mol %, especially 98 to 99.9 mol % is suitably used.

When the saponification degree is unduly low, solubility in water decreases and thus it becomes difficult to obtain a good aqueous coating liquid. Moreover, in the case where it is required for a coated film resulting from the aqueous coating liquid of the present invention to have high oxygen gas barrier properties, it is preferable to use one having a saponification degree of 99 mol % or more.

Furthermore, in the present invention, as the PVA resin (A), those obtained by copolymerizing various monomers at the production of the polyvinyl ester resin and saponifying it and various modified PVA resins obtained by introducing various functional groups through post-modification of unmodified PVA can be used The monomers for use in the copolymerization with the vinyl ester monomer include olefins such as ethylene, propylene, isobutylene, α-octene, α-dodecene, and α-octadecene; hydroxyl group-containing α-olefins such as 3-buten-1-ol, 4-penten-1-ol, 5-hexen-1-ol, and 3,4-dihydroxy-1-butene and derivatives thereof such as acylated ones; unsaturated acids such as acrylic acid, methacrylic acid, crotonic acid, maleic acid, maleic anhydride, and itaconic acid, or salts, mono esters, or di-alkyl esters thereof; nitriles such as acrylonitrile and methacrylonitrile; amides such as diacetone acrylamide, acrylamide, and methacrylamide; olefin sulfonic acids such as ethylenesulfonic acid, allylsulfonic acid, and methallylsulfonic acid or salts thereof; vinyl compounds such as alkyl vinyl ethers, dimethylallyl vinyl ketone, N-vinylpyrrolidone, vinyl chloride, vinylethylene carbonate, 2,2-dialkyl-4-vinyl-1,3-dioxolane, glycerin monoallyl ether, 3,4-diacetoxy-1-butene; substituted vinyl acetates such as isopropenyl acetate and 1-methoxyvinyl acetate; vinylidene chloride, 1,4-diacetoxy-2-butene, vinylene carbonate, and the like.

In addition, the PVA resins obtained by introducing functional groups by post-reaction may include those having an acetoacetyl group by the reaction with diketene, those having a polyalkylene oxide group by the reaction with ethylene oxide, those having a hydroxyalkyl group by the reaction with an epoxy compound, or those obtained by reacting aldehyde compounds having various functional groups with PVA, and the like.

The content of the modification species in the modified PVA resins, i.e., constituting units derived from various monomers in the copolymers or the functional groups introduced by the post-reaction is not categorically specified since properties remarkably vary depending on the modification species but is usually 0.1 to 20 mol % and a range of 1 to 10 mol % is preferably used.

Of these various modified PVA resins, in the present invention, a PVA resin having a structural unit having a 1,2-diol structure at the side chain, which is represented by the following general formula (1), is preferably used in view of excellent stability of the aqueous coating liquid and in view of capability of obtaining a coated film excellent in transparency.

Here, in the general formula (1), each of $R^1$, $R^2$, and $R^3$ independently represents a hydrogen atom or an organic group, X represents a single bond or a linking chain, and each of $R^4$, $R^5$, and $R^6$ independently represents a hydrogen atom or an organic group.

[Chem. 1]

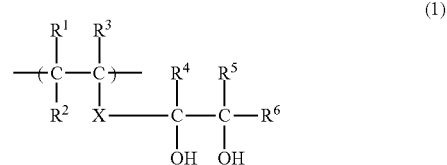

Particularly, most preferred is a PVA resin having a structural unit represented by the following general formula (1') wherein $R^1$ to $R^3$ and $R^4$ to $R^6$ all are a hydrogen atom and X is a single bond in the 1,2-diol structural unit represented by the general formula (1).

[Chem. 2]

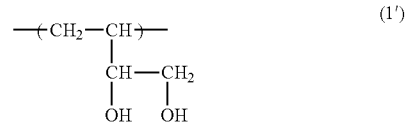

$R^1$ to $R^3$ and $R^4$ to $R^6$ in the structural unit represented by the general formula (1) may be an organic group within the amount where the resin characteristics are not significantly impaired. Examples of the organic group include alkyl groups having 1 to 4 carbon atoms such as methyl, ethyl, n-propyl, isopropyl, n-butyl, isobutyl, and tert-butyl groups, and these organic groups may have a functional group such as halogen, hydroxyl, ester, carboxylic acid, and sulfonic acid groups, according to necessity.

Moreover, X in the 1,2-diol structural unit represented by the general formula (1) is most preferably a single bond in view of stabilities under high temperature or under acidic conditions. However, X may be a linking chain within the range where the effect of the present invention is not inhibited. Such a linking chain includes hydrocarbons such as alkylene, alkenylene, alkynylene, phenylene, and naphthylene (these hydrocarbons may be substituted with halogen(s) such as fluorine, chlorine, and/or bromine), as well as —O—, —(CH$_2$O)$_m$—, —(OCH$_2$)$_m$—, —(CH$_2$O)$_m$CH$_2$—, —CO—, —COCO—, —CO(CH$_2$)$_m$CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, —OAl(OR)O— and the like (each R is independently any substituent, preferably a hydrogen atom or an alkyl group, and m is an integer of 1 to 5). Among them, an alkylene group having 6 or less carbon atoms is preferred and methylene group or —CH$_2$OCH$_2$— is particularly preferred, from the viewpoint of stability in production or in use.

A method of producing the PVA resin having a 1,2-diol structure at the side chain is not particularly limited, but there are preferably used (i) a method of saponifying a copolymer of a vinyl ester monomer and a compound represented by the following general formula (2); (ii) a method of saponifying and decarboxylating a copolymer of a vinyl ester monomer and a compound represented by the following general formula (3); and (iii) a method of saponifying and deketalizing a copolymer of a vinyl ester monomer and a compound represented by the following general formula (4).

[Chem. 3]

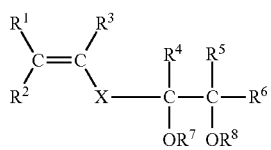

(2)

[Chem. 4]

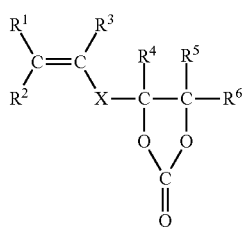

(3)

[Chem. 5]

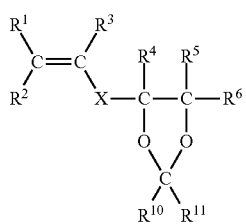

(4)

All of $R^1$, $R^2$, $R^3$, X, $R^4$, $R^5$, and $R^6$ in the above formulae (2), (3), and (4) are the same as in the case of the general formula (1). Moreover, each of $R^7$ and $R^8$ is independently a hydrogen atom or $R^9$—CO— (wherein $R^9$ is an alkyl group). Each of $R^{10}$ and $R^{11}$ is independently a hydrogen atom or an alkyl group.

Methods explained in JP-A-2006-95825 may be employable for the methods (i), (ii), and (iii).

Of these, in view of excellent copolymerization reactivity and industrial handling, in the method of (i), it is preferred to use 3,4-diacyloxy-1-butene as the compound represented by the general formula (2), and 3,4-diacetoxy-1-butene is particularly preferably used.

The content of the 1,2-diol structural unit contained in the PVA resin (A) having a 1,2-diol structure at the side chain is usually 1 to 20 mol %, and one having a content of 2 to 10 mol %, particularly 3 to 8 mol % is preferably used. When the content is unduly low, the effect of the side-chain 1,2-diol structure is hardly obtained. Contrarily, when the content is unduly high, the gas barrier properties at high humidity tend to decrease.

The content of the 1,2-diol structural unit in the PVA resin (A) can be determined based on $^1$H-NMR spectrum (solvent: DMSO-d6, internal standard: tetramethylsilane) of completely saponified PVA resin, and concretely, may be calculated from the areas of peaks derived from hydroxyl group protons, methine protons, and methylene protons in the 1,2-diol unit and methylene protons in the main chain, protons of hydroxyl groups linked to the main chain, and the like.

Moreover, the PVA resin (A) for use in the present invention may be one kind thereof or a mixture of two or more kinds thereof. In that case, use can be made of combinations of the aforementioned unmodified PVA resins themselves, the unmodified PVA and a PVA resin having a structural unit represented by the general formula (1), PVA resins themselves having a structural unit represented by the general formula (1) different in saponification degree, polymerization degree, and modification degree, unmodified PVA, or a PVA resin having a structural unit represented by the general formula (1) and other modified PVA resin(s), and the like.

[PEI (B)]

Next, PEI (B) for use in the present invention is described.

PEI (B) is a polymer of an ethyleneimine and includes linear ones containing secondary amine(s) alone and branched ones containing primary, secondary, and/or tertiary ones. In the present invention, any of them and a mixture of them can be used. In addition, it is also possible to use a derivative in which various functional groups such as a cationic group are introduced if the amount thereof is sufficiently small where the effect of the present invention is not inhibited.

In the present invention, with regard to the polymerization degree of PEI (B), one having a polymerization degree of usually 200 to 100,000, particularly 300 to 10,000 is suitably used.

When the polymerization degree is unduly small, there is a tendency that the adhesiveness between the PVA resin layer and the substrate layer becomes insufficient and, when it is unduly large, high temperature and/or a long period of time are required for dissolving it in water, and viscosity of the resulting aqueous coating liquid increases and thus coatability is impaired in some cases.

Incidentally, since such PEI (B) is a viscous liquid, it is preferable to convert it into a solution beforehand for improving handling ability for transfer, weighing, and addition. As such a solvent, water, an alcohol such as methanol, isopropanol, or butanol, and a mixed solvent thereof are preferably used.

[Nonionic Surfactant (C)]

Next, the nonionic surfactant (C) for use in the present invention is described.

As the nonionic surfactant (C), known ones can be used. Specifically, the nonionic surfactant (C) includes ether-based compounds such as an ethylene oxide adduct of an acetylene alcohol, an ethylene oxide adduct of an acetylene glycol, ethylene oxide-propylene oxide block copolymer, polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and a polyoxyalkylene alkyl ether; ester-based compounds such as polyoxyethylene oleate ester, polyoxyethylene distearate ester, sorbitan laurate, sorbitan monostearate, sorbitan monooleate, sorbitan sesquioleate, polyoxyethylene monooleate, and polyoxyethylene stearate; silicon-based compounds such as dimethylpolysiloxane; fluorine-containing compounds such as fluoroalkyl esters and perfluoroalkylcarboxylate salts; and the like.

Of these, in view of remarkably obtaining the effect of the present invention, ether-based compounds are preferred and particularly, an ethylene oxide adduct of an acetylene glycol and ethylene oxide-propylene oxide block copolymer are suitably used.

The ethylene oxide adduct of an acetylene glycol can be represented by the following formula (5) and each of $R^{12}$ and $R^{15}$ in the general formula (5) independently represents an alkyl group having 1 to 20 carbon atoms. Particularly, one having 1 to 5 carbon atoms is preferred and especially, one having 3 to 5 carbon atoms is preferably used. Moreover, each of $R^{13}$ and $R^{14}$ independently represents an alkyl group having 1 to 3 carbon atoms and a methyl group is preferably used. Incidentally, $R^{12}$ and $R^{15}$ as well as $R^{13}$ and $R^{15}$ may be each the same or different but one having the same structure as each group is preferably used.

Furthermore, each of n and m is an integer of 0 to 30 and particularly, one in which m+n is 1 to 10, particularly 1 to 5, and especially 1 to 3 is preferably used.

[Chem. 6]

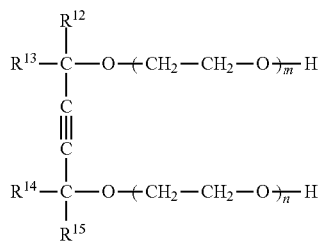

(5)

Specific examples of the ethylene oxide adduct of an acetylene glycol include an ethylene oxide adduct of 2,5,8,11-tetramethyl-6-dodecyne-5,8-diol, an ethylene oxide adduct of 5,8-dimethyl-6-dodecyne-5,8-diol, an ethylene oxide adduct of 2,4,7,9-tetramethyl-5-decyne-4,7diol, an ethylene oxide adduct of 4,7-dimethyl-5-decyne-4,7-diol, an ethylene oxide adduct of 2,3,6,7-tetramethyl-4-octyne-3,6-diol, an ethylene oxide adduct of 3,6-dimethyl-4-octyne-3,6-diol, an ethylene oxide adduct of 2,5-dimethyl-3-hexyne-2,5-diol, and the like.

Of these, an ethylene oxide adduct of 2,5,8,11-tetramethyl-6-dodecyne-5,8-diol in which the addition amount (m+n) of ethylene oxide is 1 to 3 is preferably used.

Moreover, ethylene oxide-propylene oxide block copolymer can be, for example, represented by the following general formula (6). In the general formula (6), each of x and y is 2 to 8, particularly preferably 3 to 7. The ratio x/y is 90/10 to 10/90 and one having a ratio of 60/40 to 40/60 is preferably used. Moreover, one having a polymerization degree (x+y) of 400 to 8,000 is preferably used.

[Chem 7]

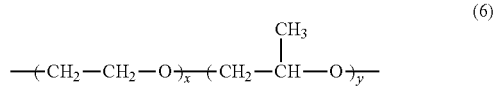

(6)

Incidentally, these nonionic surfactants may be used singly but a plurality of them can also be used in combination. Particularly, the use of the aforementioned ethylene oxide adduct of an acetylene glycol and ethylene oxide-propylene oxide block copolymer in combination remarkably affords the effects of the present invention.

The blending ratio of the ethylene oxide adduct of an acetylene glycol to the ethylene oxide-propylene oxide block copolymer is usually 80/20 to 20/80 in terms of weight ratio and a range of particularly 70/30 to 30/70, especially 60/40 to 40/60 is used.

Incidentally, it is preferable to use the nonionic surfactant as a solution for improving handling ability for transfer, weighing, and addition. As a solvent at the time, water, a monohydric alcohol such as methanol, isopropanol, or butanol, a polyhydric alcohol such as ethylene glycol, propylene glycol, or glycerin, a polymer of a polyhydric alcohol, such as polyglycerol, and a mixed solvent thereof are preferably used.

The concentration at the time is not particularly limited but is usually 20 to 60 weight % and particularly, a range of 30 to 50 weight % is preferably used.

[Aqueous Solvent (D)]

Next, the aqueous solvent (D) for use in the present invention is described.

As the aqueous solvent (D), water or a mixed solvent containing water as a main component is used. As a substance other than water, which is used in the case where a mixed solvent is used as the aqueous solvent (D), an organic solvent mixable with water in any ratio is used. Specifically, such organic solvent includes alcohols having 1 to 3 carbon atoms, ketones, and the like. The blending ratio of water to the substance other than water in the aqueous solvent (D) is usually 100/0 to 60/40 in terms of weight ratio. A range of particularly 100/0 to 80/20, especially 100/0 to 90/10 is used.

[Aqueous Coating Liquid]

The aqueous coating liquid of the present invention contains the aforementioned PVA resin (A), PEI (B), nonionic surfactant (C), and aqueous solvent (D).

The content ratio (A)/(B) of the PVA resin (A) to PEI (B) in the aqueous coating liquid of the present invention (weight ratio) is usually 95/5 to 60/40 and a range of particularly 90/10 to 70/30, especially 85/15 to 75/25 is suitably used.

In the content ratio of the PVA resin to PEI (B), when the blending amount of PEI (B) is unduly small, there is a tendency that the adhesiveness between the coated film resulting from the aqueous coating liquid of the present invention and the substrate becomes insufficient. Contrarily, when the amount is unduly large, the gas barrier properties of the coated film tend to become insufficient.

Moreover, with regard to the blending amount of the nonionic surfactant (C) in the aqueous coating liquid of the present invention, a range of usually 0.01 to 5 parts by weight, particularly 0.05 to 3 parts by weight, and especially 0.05 to 2 parts by weight is used relative to 100 parts by weight of the total amount of the PVA resin (A) and PEI (B).

When the blending amount of the nonionic surfactant (C) is unduly small, the resulting coated film tends to become heterogeneous possibly due to difficulty in suppressing the phase separation of the PVA resin (A) and PEI (B) during drying. When the blending amount of the nonionic surfactant (C) is unduly large, the gas barrier properties of the coated film tend to become insufficient.

The concentration of the aqueous coating liquid of the present invention is usually 0.1 to 30 weight % and one having a range of particularly 1 to 20 weight %, especially 5 to 15 weight % is preferably used.

When the concentration is unduly high, there is a tendency that air bubbles generated during substrate coating are difficult to remove, workability at coating decreases, and a homogeneous coated layer is difficult to obtain. Contrarily, when the concentration of the aqueous coating liquid is unduly low, there are cases where drying requires a long period of time and a coated layer having a desired thickness is difficult to obtain and hence multiple times of coating are needed in some cases.

As a method of producing the aqueous coating liquid of the present invention, known methods of preparing an aqueous liquid containing a plurality of water-soluble compounds can be adopted. For example, such method includes (1) a method of preparing respective aqueous solutions and mixing them, (2) a method of blending PEI (B) and a nonionic surfactant (C) into an aqueous PVA resin (A) solution and mixing them, and the like.

In addition, into the aqueous coating liquid of the present invention, there may be blended known additives such as an antifoaming agent, a surfactant, an ultraviolet absorber, an antioxidant, a coloring agent, a fluorescent dye, an antiseptic agent, an antifungal agent, and a layered inorganic compound for further improving gas barrier properties, within the range where the effect of the present invention is not inhibited. Furthermore, for the purpose of improving wettability of the substrate and controlling the drying rate, an organic solvent other than water may be incorporated. Specifically, such organic solvent includes alcohols having 1 to 4 carbon atoms and ketones, which have miscibility with water.

[Coated Film]

The thus obtained aqueous coating liquid of the present invention can afford coated films by applying it on various substrates such as plastics and drying it.

Such substrates are not particularly limited and materials thereof include synthetic resins such as thermoplastic resins and thermosetting resins, glass, metal materials such as aluminum foils, and natural materials such as paper and wood, and forms thereof include films, sheets, nonwoven fabrics, various molded articles, and the like.

Of these, as materials that afford the effects of the present invention at the maximum, hydrophobic plastic substrates may be exemplified. Specifically, such substrates include polyolefin-based resins such as low density polyethylene, very low density polyethylene, high density polyethylene, polypropylene, ethylene-propylene copolymer, ethylene-butene copolymer, ethylene-vinyl acetate copolymer, ethylene-methyl methacrylate copolymer, and ionomer resins; aromatic polyester resins such as polyethylene terephthalate, polybutylene terephthalate, and polyethylene naphthalate; aliphatic polyester resins such as polylactic acid, polybutylene succinate, and polybutylene succinate adipate; polyamide resins such as Nylon-6, Nylon 6,6, and meta-xylenediamine-adipic acid polycondensates; acrylic resins such as polymethacryaltes and polymethyl methacrylate; styrene-based resins such as polystyrene and styrene-acrylonitrile; cellulose-based resins such as cellulose triacetate and cellulose diacetate; halogen-containing resins such as polyvinyl chloride, polyvinylidene chloride, and polyvinylidene fluoride; engineering plastics such as polycarbonate resin, polysulfone resin, polyether sulfone resin, polyether ether ketone resin, polyphenylene oxide resin, and liquid crystalline polymers; and the like.

Moreover, it is preferable to apply the aqueous coating liquid of the present invention onto such a plastic substrate after a surface thereof is activated by a plasma treatment, a corona treatment, an electron beam treatment, or the like.

As a method of applying the aqueous coating liquid of the present invention onto the aforementioned substrate, known coating methods, for example, a gravure method such as a direct gravure method or a reverse gravure method; a roll coating method such as a two-roll beat coating method or a bottom field three-roll method, a doctor knife method, a die coating method, a dip coating method, and a bar coating method; and the like can be used.

After the aqueous coating liquid of the present invention is applied onto the substrate, water and the other volatile matter are removed by drying. Drying temperature at the time should be appropriately controlled depending on the thickness of the coated layer but is usually 10 to 200° C. and a range of particularly 20 to 150° C., especially 30 to 120° C. is suitably employed. Moreover, drying time is also appropriately controlled depending on the aforementioned drying temperature so that the volatile matter is removed to a predetermined amount or less but is usually 0.1 to 120 minutes and particularly, drying is conducted in a range of 0.5 to 60 minutes.

The film thickness of the thus obtained coated film resulting from the aqueous coating liquid of the present invention is usually 0.1 to 20 µm and a range of particularly 0.5 to 15 µm, especially 1 to 10 µm is preferably employed. When the film thickness is unduly thin, sufficient gas barrier properties are not obtained in some cases. On the other hand, when the film thickness is unduly thick, the flexibility tends to be impaired in the case where coating is conducted on a soft film substrate.

It is also possible to laminate other thermoplastic resin(s) further on the coated film to form a multilayered structure. As a layer constitution at the time, when the PVA resin layer is taken as a (a1, a2, . . . ) and the thermoplastic resin layer is taken as b (b1, b2, . . . ), not only a two-layered structure of a/b but also any combinations such as b/a/b, a/b/a, a1/a2/b, a/b1/b2, b2/b1/a/b1/b2, b1/b2/a/b3/b4, and a1/b1/a2/b2 are possible and particularly, a layered structure of b/a/b or b2/b1/a/b1/b2 is preferred.

Furthermore, it is also a preferable embodiment to provide a deposited layer resulting from a metal or an inorganic component on the coated film resulting from the aqueous coating liquid of the present invention or a surface or interface of a thermoplastic resin layer laminated thereon.

The film thickness of the multilayered structure is usually 0.1 to 100 µm and is a range of particularly 1 to 50 µm, especially 2 to 30 µm. When the film thickness is unduly thin, there is a tendency that sufficient gas barrier properties are not obtained. Contrarily, when the film is unduly thick, flexibility tends to be impaired.

EXAMPLES

The following will explain the present invention with reference to Examples, but the invention is not limited to the description of Examples unless exceeding its gist.

Incidentally, "parts", "%", and "ratio" in Description are on the weight basis, unless otherwise indicated.

Example 1

Production of PVA Resin (A1)

In a reaction vessel equipped with a reflux condenser, a dropping funnel, and a stirrer, 68.0 parts of vinyl acetate, 23.8 parts of methanol, and 8.2 parts of 3,4-diacetoxy-1-butene were placed. Then, 0.3 mol % (based on the amount of employed vinyl acetate) of azobisisobutyronitrile was added, and the temperature was raised with stirring under a nitrogen atmosphere, thus, initiating polymerization. When the polymerization degree of vinyl acetate reached 90%, m-dinitrobenzene was added thereto to terminate the polymerization. Successively, unreacted vinyl acetate monomer was removed to outside the system by a method of blowing methanol vapor into the system, thereby forming a methanol solution of a copolymer.

Then, the above methanol solution was further diluted with methanol to adjust the concentration to 45% and then was provided in a kneader. While keeping the solution temperature at 35° C., a 2% methanol solution of sodium hydroxide was added thereto in such a ratio as to be 10.5 mmol relative to 1 mol of the total amount of the vinyl acetate structural unit and the 3,4-diacetoxy-1-butene structural unit in the copolymer, thereby performing saponification. As the saponification proceeded, a saponification product was precipitated. When the product became in the form of particles, the product was separated by filtration and then was washed thoroughly with methanol and dried in a hot-air dryer to prepare an objective PVA resin (A1).

The saponification degree of the obtained PVA resin (A1) was 99.2 mol % when analyzed based on the residual vinyl acetate and the consumed amount of the alkali required for hydrolysis of 3,4-diacetoxy-1-butene. The average degree of polymerization was 450 when analyzed in accordance with JIS K 6726. The content of the 1,2-diol structural unit shown by the formula (1) was 6 mol %, when calculated from the integral value obtained by $^1$H-NMR (300 MHz proton NMR, d6-DMSO solution, internal standard substance: tetramethylsilane, 50° C.).

[Production of Aqueous Coating Liquid]

A 10% aqueous solution of the obtained PVA resin (A1) was prepared. Thereto were blended PEI ("TITA BOND T-100" manufactured by Nippon Soda Co., Ltd.) (B1) and a nonionic surfactant (ethylene oxide adduct of acetylene glycol: 20 weight %, ethylene oxide-propylene oxide block copolymer in which x/y is 50/50 in the general formula (6): 20 weight %, polyglycerol: 50 weight %, water: 10 weight %) (C1) so that the contents of respective pure components became 80 parts by weight of the PVA resin (A1), 20 parts by weight of PEI (B1), and 0.5 parts by weight of the nonionic surfactant (C1), thereby obtaining an aqueous coating liquid.

<Stability of Aqueous Coating Liquid>

The obtained aqueous coating liquid was placed under a constant temperature of 5° C. for 24 hours, and viscosity before and after the treatment was measured on a B-type viscometer to determine a thickening ratio.

[Preparation of Coating Film]

The obtained aqueous coating liquid was cast on a PET film ("Taiko Polyester Film FE2001" manufactured by Futamura Chemical Co., Ltd.) whose surface had been corona-treated and was dried in a hot-air drier at 100° C. for 10 minutes, thereby preparing a coating film having a coated film having a thickness of 3 μm.

<Homogeneity>

The state of the obtained coated film after drying was visually observed and homogeneity was evaluated according to the following criteria. The results are shown in Table 1.

◎: The coated film is transparent as a whole and phase separation is not observed.

○: The coated film is transparent as a whole but phase separation is slightly observed in the periphery of the coated film.

Δ: The coated film is slightly turbid as a whole and phase separation is slightly observed in the periphery of the coated film.

x: Phase separation is observed as a whole.

<Adhesiveness>

A cellophane tape ("No. 252" manufactured by Sekisui Chemical Co., Ltd., width: 15 mm) was cut into a length of 6 cm and was attached to the coating film so that a central part (a part that is 3 cm apart from the end) of the tape came onto a boundary between the coated film part and non-coated part of the coating film. The tape on the non-coated part was peeled by 1 cm from the end and, with holding the portion, the tape was peeled off with great force at an angle of about 90° against the film surface.

The same operation was repeated five times (five places) and the state of the coated film was visually observed. The case where no peeling thereof was observed four or more times was judged as good in adhesiveness, the case where peeling thereof was observed four or more times was judged as bad in adhesiveness, and retest was conducted in the other cases. The results are shown in Table 1.

<Oxygen Gas Barrier Properties>

The oxygen permeability (converted value as a thickness of 3 μm) of the obtained films at 23° C. under 50% RH and at 23° C. under 65% RH was measured using "OXTRAN 2/20" manufactured by MOCON. The results are shown in Table 1.

Example 2

An aqueous coating liquid and a coated film were prepared in the same manner as in Example 1 except that an unmodified PVA resin (A2) having a saponification degree of 99 mol % and a polymerization degree of 500 was used instead of the PVA resin (A1) in Example 1, and evaluation was similarly performed. The results are shown in Table 1.

Example 3

An aqueous coating liquid and a coated film were prepared in the same manner as in Example 1 except that a nonionic surfactant (ethylene oxide adduct of acetylene glycol: 20 weight %, ethylene oxide-propylene oxide block copolymer in which x/y is 10/90 in the general formula (6): 20 weight %, polyglycerol: 50 weight %, water: 10 weight %) (C2) was used instead of the nonionic surfactant (C1) in Example 1, and evaluation was similarly performed. The results are shown in Table 1.

Example 4

An aqueous coating liquid and a coated film were prepared in the same manner as in Example 1 except that a nonionic surfactant (ethylene oxide adduct of acetylene glycol: 20 weight %, ethylene oxide-propylene oxide block copolymer in which x/y is 90/10 in the general formula (6): 20 weight %, polyglycerol: 50 weight %, water: 10 weight %) (C3) was used instead of the nonionic surfactant (C1) in Example 1, and evaluation was similarly performed. The results are shown in Table 1.

Example 5

An aqueous coating liquid and a coated film were prepared in the same manner as in Example 1 except that a nonionic surfactant (ethylene oxide-propylene oxide block copolymer in which x/y is 50/50 in the general formula (6): 40 weight %, polyglycerol: 50 weight %, water: 10 weight %) (C4) was used instead of the nonionic surfactant (C, 1) in Example 1, and evaluation was similarly performed. The results are shown in Table 1.

Comparative Example 1

An aqueous coating liquid and a coated film were prepared in the same manner as in Example 1 except that the nonionic surfactant (C1) was not blended in Example 1, and evaluation was similarly performed. The results are shown in Table 1.

Comparative Example 2

An aqueous coating liquid and a coated film were prepared in the same manner as in Example 1 except that PEI (B1) was not blended in Example 1, and evaluation was similarly performed. The results are shown in Table 1.

TABLE 1

| | Stability of coating liquid | Homogeneity | Adhesiveness | Oxygen permeability (cc · 3 μm/m² · day · atm) 23° C., 50% RH | 23° C., 65% RH |
|---|---|---|---|---|---|
| Example 1 | 1.1 | ◉ | good | 0.9 | 14 |
| Example 2 | 2.5 | ◉ | good | 0.8 | 12 |
| Example 3 | 1.1 | ○ | good | 1.2 | 20 |
| Example 4 | 1.1 | ○ | good | 1.2 | 21 |
| Example 5 | 1.1 | △ | good | 1.5 | 30 |
| Comparative Example 1 | 1.1 | X | good | — | — |
| Comparative Example 2 | 1.1 | ◉ | bad | 0.9 | 14 |

From the above results, the coated films of Examples formed on the polyester film substrate using the aqueous coating liquids of the present invention were excellent in adhesiveness to the substrate and gas barrier properties and also were excellent in homogeneity with absolutely no phase separation or extremely little phase separation. However, phase separation was observed as a whole in the coated film of Comparative Example 1 in which no nonionic surfactant was blended, and the coated film of Comparative Example 2 where no PEI was blended was inferior in adhesiveness to the substrate.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2011-217621 filed on Sep. 30, 2011 and Japanese Patent Application No. 2012-213369 filed on Sep. 27, 2012, and the contents are incorporated herein by reference

INDUSTRIAL APPLICABILITY

Since the aqueous coating liquid of the present invention affords coated films excellent in transparency and gas barrier properties, excellent in adhesiveness to plastic substrates, and further excellent in homogeneity, the aqueous coating liquid is industrially extremely useful as a material capable of conveniently imparting gas barrier properties to plastic materials.

The invention claimed is:

1. An aqueous coating liquid comprising a polyvinyl alcohol resin (A), a polyethyleneimine (B), a nonionic surfactant (C), and an aqueous solvent (D), wherein the polyvinyl alcohol resin (A) and the polyethyleneimine (B) are present in a weight ratio of 95/5 to 60/40, wherein the nonionic surfactant (C) comprises an ethylene oxide adduct of acetylene glycol and an ethylene oxide-propylene oxide block copolymer.

2. The aqueous coating liquid according to claim 1, wherein a blending amount of the nonionic surfactant (C) is 0.01 to 5 parts by weight relative to 100 parts by weight of the total amount of the polyvinyl alcohol resin (A) and the polyethyleneimine (B).

3. The aqueous coating liquid according to claim 1, wherein the polyvinyl alcohol resin (A) is a polyvinyl alcohol resin having a 1,2-diol structural unit represented by the following formula (1):

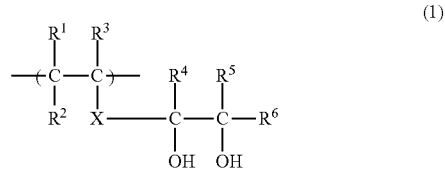

wherein each of $R^1$, $R^2$, and $R^3$ independently represents a hydrogen atom or an organic group, X represents a single bond or a linking chain, and each of $R^4$, $R^5$, and $R^6$ independently represents a hydrogen atom or an organic group.

4. The aqueous coating liquid according to claim 1, wherein the aqueous solvent (D) is water.

5. A coated film obtained by applying the aqueous coating liquid according to claim 1 on a substrate surface and drying the aqueous coating liquid.

* * * * *